United States Patent [19]

Nagahara et al.

[11] Patent Number: 5,589,634
[45] Date of Patent: Dec. 31, 1996

[54] SEMICONDUCTOR ACCELERATION SENSOR FOR DETECTING ACCELERATION IN ORTHOGONAL DIRECTIONS

[75] Inventors: Teruaki Nagahara; Masahiro Yamamoto, both of Itami, Japan

[73] Assignee: Mitsubishi Denki Kabushiki Kaisha, Tokyo, Japan

[21] Appl. No.: 512,632

[22] Filed: Aug. 8, 1995

[30] Foreign Application Priority Data

Mar. 15, 1995 [JP] Japan ................................. 7-056223

[51] Int. Cl.$^6$ ...................................................... G01P 15/12
[52] U.S. Cl. ............................................................ 73/514.33
[58] Field of Search ............................ 73/514.33, 514.36, 73/514.21, 514.23, 862.634; 338/2, 5

[56] References Cited

U.S. PATENT DOCUMENTS 4,522,072  6/1985  Sulouff et al. ....................... 73/514.33

Primary Examiner—John E. Chapman
Attorney, Agent, or Firm—Leydig, Voit & Mayer

[57] ABSTRACT

A semiconductor acceleration sensor capable of sensing acceleration in two orthogonal directions has an acceleration sensor beam which is provided with a diaphragm 9 formed in the reverse side thereof. The diaphragm is narrowed by, for example, etching also in Z-axis direction which is the widthwise direction of the acceleration sensor beam, so that the acceleration sensor beam is easily deflectable also in the Z-axis direction. A first group of gauge resistors forming a bridge circuit are arranged on a first side of the diaphragm 9 at portions adjacent to the pedestal which cantilevers the acceleration sensor beam. A second group of resistors forming another bridge circuit are arranged on the first side of the diaphragm 9 at portions adjacent to the corners of the diaphragm. Alternatively, the second group of gauge resistors may be arranged on a narrowed portion of the acceleration sensor beam, formed at a location other than that of the diaphragm. The acceleration sensor is capable of detecting acceleration in two orthogonal directions, thus making it possible to reduce the number of acceleration sensors in a system which requires acceleration detection in two or three directions.

2 Claims, 5 Drawing Sheets

SEMICONDUCTOR ACCELERATION SENSOR FOR DETECTING ACCELERATION IN ORTHOGONAL DIRECTIONS

BACKGROUND OF THE INVENTION

1. Field of the Invention

The present invention relates to a semiconductor acceleration sensor for use in, for example, an automotive ABS (anti-lock braking system), air-bag system, suspension system and so forth.

2. Description of the Related Art

FIG. 5 is a perspective view of a conventional acceleration sensor. Referring to this Figure, an acceleration sensing beam 3 is provided with gauge resistors 1a to 1d each capable of converting mechanical stress into an electrical signal by piezoelectric resistance effect. These gauge resistors 1a to 1d are electrically connected so as to form a bridge circuit which is not shown. The reverse side of the acceleration sensor beam 3, opposite to the side where the gauge resistors 1a to 1d are formed, is partly thin-walled so as to provide a diaphragm 2.

The acceleration sensor beam 3 is cantilevered by a pedestal 4 which in turn is fixed to a base substrate 5. Lead pins 6 for transmitting electrical signals from the acceleration sensor beam 3 to the exterior of the sensor are provided on the base substrate 5. The lead pins 6 are electrically connected to the acceleration sensor beam 3 through wires 7. Although not shown, a cap is provided on the base substrate 5 so as to cover the acceleration sensor beam 3.

In operation of the conventional semiconductor acceleration sensor having the described construction, acceleration is applied to the sensor in a direction perpendicular to the major surface of the base substrate shown in FIG. 5, so that the acceleration sensor beam 3 is deflected by an amount corresponding to the magnitude of the acceleration. As a result of the deflection of the acceleration sensor beam 3, electrical resistances are changed in the resistors 1a to 1d, and an electromotive force is generated in the bridge circuit so as to indicate the magnitude of the acceleration.

The conventional acceleration sensor of the type described suffers from a disadvantage in that acceleration is detectable only in the direction perpendicular to the base substrate 5. Therefore, a suspension system which is required to operate in response to accelerations acting in two or three directions essentially necessitate two or three semiconductor acceleration sensors, resulting in an increase in the number of parts employed.

SUMMARY OF THE INVENTION

Accordingly, an object of the present invention is to provide a semiconductor acceleration sensor capable of detecting accelerations acting in two orthogonal directions.

To this end, according to one aspect of the present invention, there is provided a semiconductor acceleration sensor. The semiconductor acceleration sensor includes: an acceleration sensor beam; a diaphragm formed on one of the major opposite surfaces of the acceleration sensor beam, the diaphragm having a reduced width as measured in the direction perpendicular to the longitudinal axis of the acceleration sensor beam and a pair of groups of gauge resistors arranged on the reverse side of the diaphragm at end portions of the diaphragm as viewed in the longitudinal direction of the acceleration sensor beam. The semiconductor acceleration sensor further includes a pair of bridge circuits formed by electrically connecting the gauge resistors of the respective groups, the bridge circuits being such that one of the bridge circuits is formed by connecting the gauge resistors of one of the groups so as to be able to sense acceleration acting in the direction of thickness of the acceleration sensor beam, while the other of the bridge circuits is formed by connecting the gauge resistors of the other of the groups so as to be able to sense acceleration acting in the direction which is perpendicular both to longitudinal and thicknesswise directions of the acceleration sensor beam. In addition, the semiconductor acceleration sensor includes a pedestal which cantilevers the acceleration sensor beam; a base substrate to which the pedestal is fixed; and electrical connecting means for transmitting electrical signals from the acceleration sensor beam to the exterior of the sensor.

Another aspect of the invention provides a slightly different semiconductor acceleration sensor. This semiconductor acceleration sensor includes: an acceleration sensor beam; a diaphragm formed on one of the major opposing surfaces of the acceleration sensor beam; a first group of gauge resistors arranged on the reverse side of the diaphragm; a narrowed portion of the acceleration sensor beam, formed at a location other than the location where the diaphragm is formed; and a second group of gauge resistors arranged on the narrowed portion. This semiconductor acceleration sensor also includes a first bridge circuit formed by connecting the gauge resistors of the first group so as to sense acceleration acting in the thicknesswise direction of the acceleration sensor beam; a second bridge circuit formed by connecting the gauge resistors of the second group so as to sense acceleration acting in the direction perpendicular both to the longitudinal and thicknesswise directions of the acceleration sensor beam; a pedestal which cantilevers the acceleration sensor beam; a base substrate to which the pedestal is fixed; and electrical connecting means for transmitting electrical signals from the acceleration sensor beam to the exterior of the sensor.

The above and other objects, features and advantages of the present invention will become clear from the following description of the preferred embodiments when the same is read in conjunction with the accompanying drawings.

BRIEF DESCRIPTION OF THE DRAWINGS

Throughout the drawings, the same reference numerals are used to denote the same or equivalent parts or components.

DESCRIPTION OF THE PREFERRED EMBODIMENTS

First Embodiment

Figure 1A:
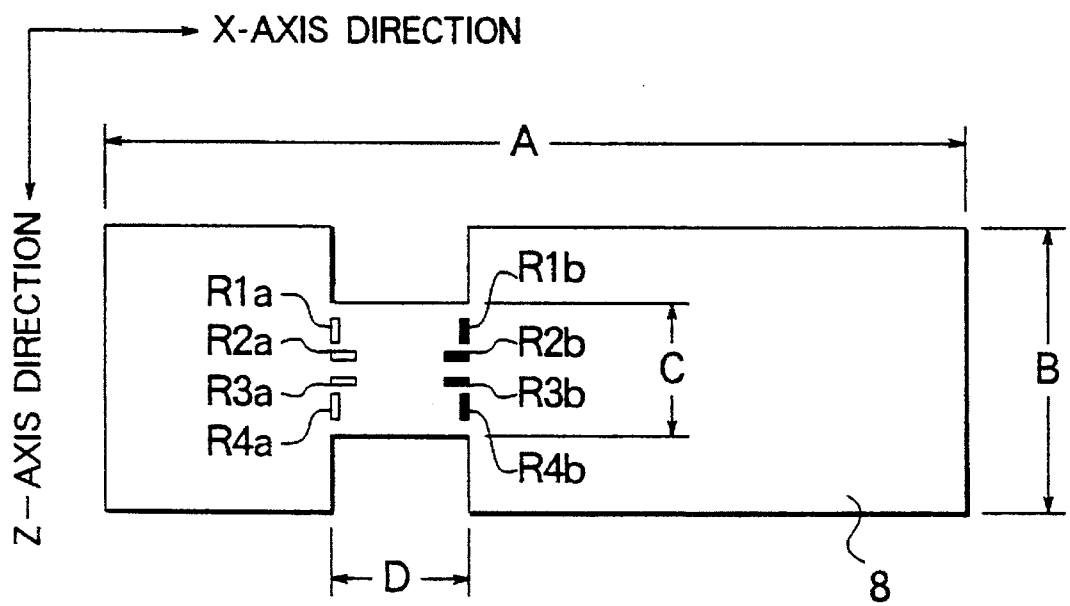
FIGS. 1A and 1B are a plan view and a sectional side elevational view of a critical portion of a first embodiment of the semiconductor acceleration sensor in accordance with the present invention.
Figure 1B:
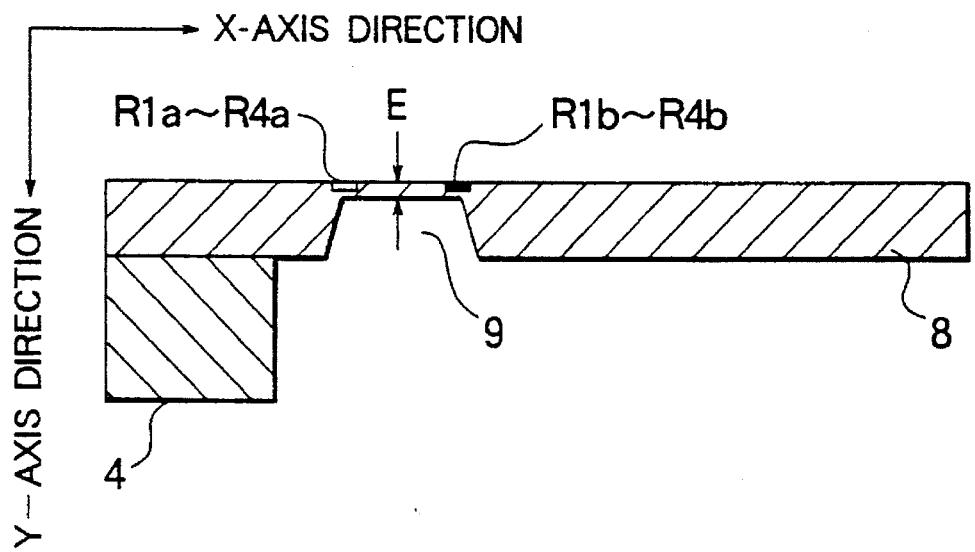

Referring to FIGS. 1A and 1B, an acceleration sensor beam 8, which is provided with a diaphragm 9 on the reverse side thereof, is cantilevered by a pedestal 4. The diaphragm 9 of the acceleration sensor beam 8 is thinned also in Z-axis direction (direction of width of the acceleration sensor beam 8) by, for example, etching, so that the beam 8 is easily deflectable also in the direction of the Z axis.

Dimensions A, B and C in FIG. 1 are 10 mm, 3 mm and 1.5 mm, respectively. The length D and the thickness E of the diaphragm 9 are respectively several hundreds of μm and 100 μm to several hundreds of μm, respectively.

Gauge resistors R1a to R4a are formed on a portion of the reverse side of the diaphragm 9 of the acceleration sensor beam 8 adjacent to the pedestal 4. These gauge resistors R1a to R4a are adapted to convert stresses into electrical signals by semiconductor piezoresistive effect. Similarly, gauge resistors R1b to R4b are formed on the portion of the reverse side of the diaphragm 9 adjacent the end of the acceleration sensor beam 8. The gauge resistors R1a to R4a are connected to form a bridge circuit 1 shown in FIG. 2A, while the gauge resistors R1b to R4b are connected to form a bridge circuit 2 shown in FIG. 2B.

The pedestal 4 is fixed to a base substrate which is not shown, and is provided with electrical connecting means which transmits electrical signals from the acceleration sensor beam 8 to the exterior of the sensor.

In the semiconductor acceleration sensor having the described arrangement, all the eight gauge resistors are arranged in the direction of the crystalline axis of the silicon substrate, and are adapted to increase and decrease the resistance value when tensed and compressed, respectively.

Figure 2A:
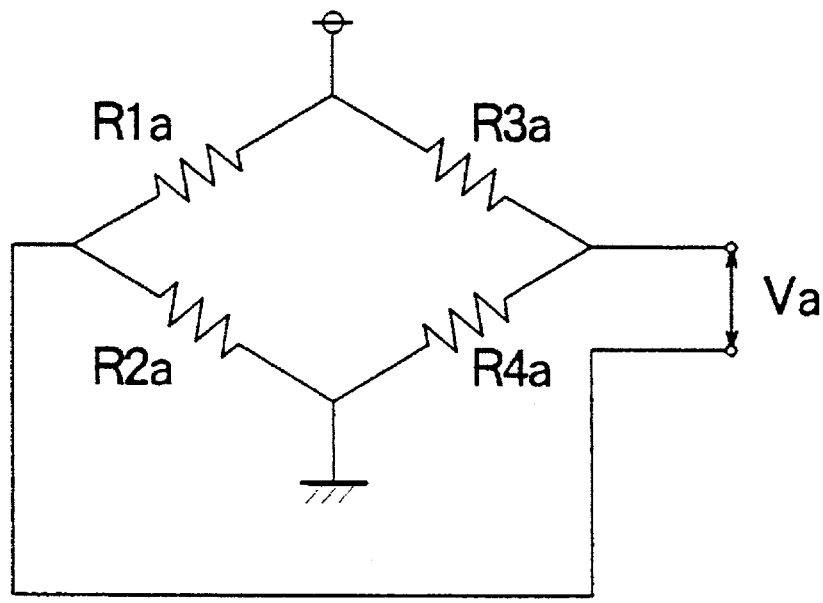
FIGS. 2A and 2B are circuit diagrams of gauge resistors employed in the embodiment shown in FIG. 1.

It is assumed here that an acceleration is applied in the direction of the Y axis of the semiconductor acceleration sensor. In such a case, the resistance value of the gauge resistors R2a and R3a increase by ΔR as these resistors are tensed, while the gauge resistors R1a and R4a decrease their resistance by ΔR as these resistors are compressed. Consequently, a voltage differential Va corresponding to the magnitude of the acceleration applied is generated between the output terminals of the bridge circuit 1, as shown in FIG. 2A.

Figure 2B:
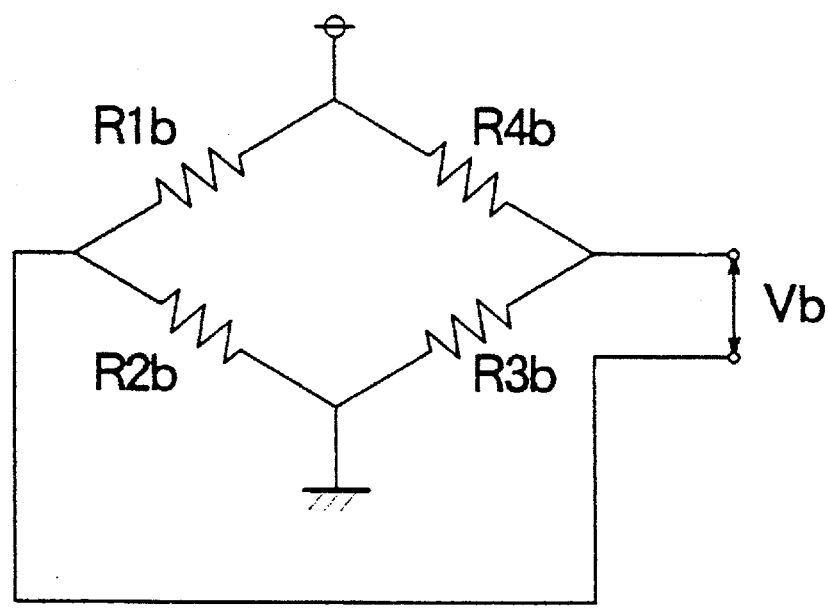

Conversely, when an acceleration is applied in the direction of the Z Axis, the resistance value of the gauge resistors R2b and R4b increase by ΔR as these resistors are tensed, while the gauge resistors R1b and R3b decrease their resistance by ΔR as these resistors are compressed. Consequently, a voltage differential Vb corresponding to the magnitude of the acceleration applied is generated between the output terminals of the bridge circuit 2, as shown in FIG. 2B. It is thus possible to detect, by using these eight gauge resistors, accelerations both in the directions of Y and Z axes.

Second Embodiment

Figure 3A:
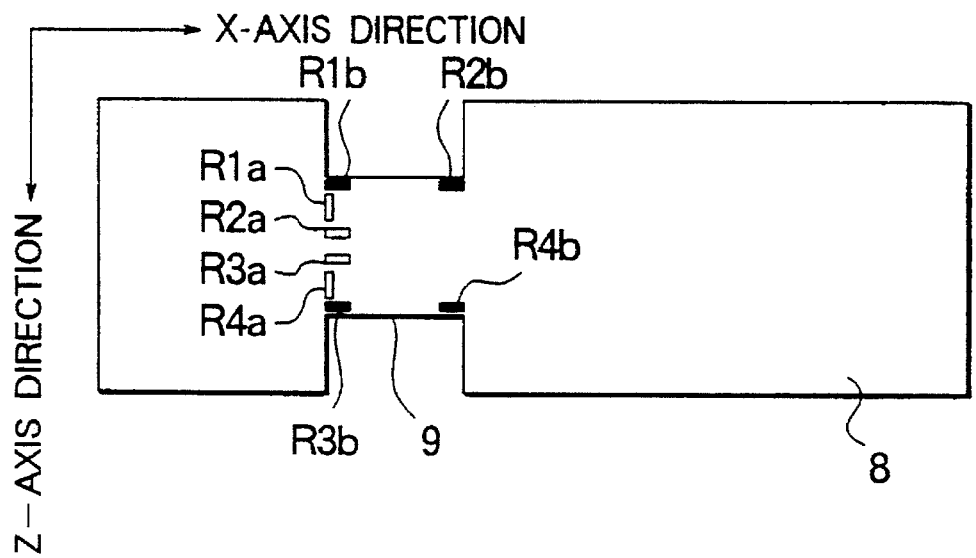
FIG. 3A and FIGS. 3B, 3C are a plan view of a critical portion of a second embodiment of the semiconductor acceleration sensor in accordance with the present invention, and circuit diagrams of gauge resistors incorporated in the second embodiment, respectively.
Figure 3B:
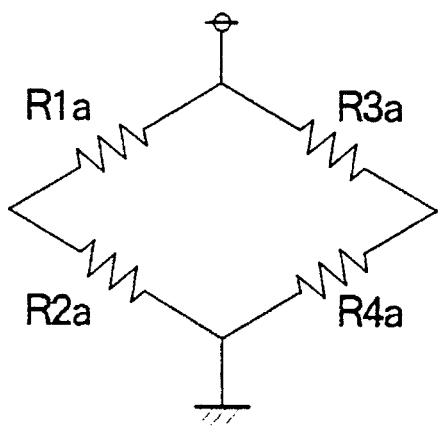
Figure 3C:
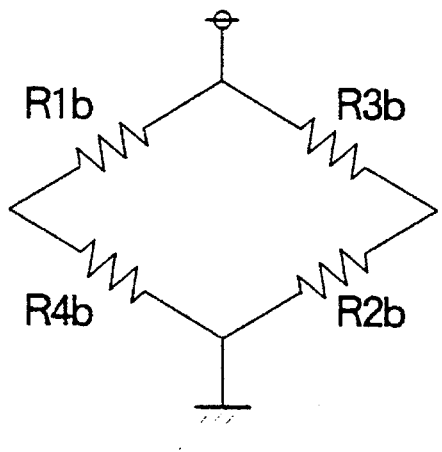

The arrangement of the resistors employed in the first embodiment has a shortcoming in that the bridge circuit composed of the gauge resistors R1b, R2b, R3b and R4b, which is intended to detect acceleration acting in the direction of the Z axis, exhibits comparatively small sensitivity to the acceleration acting in this direction due to the structure of the sensor. To eliminate this problem, in the second embodiment of the present invention, the gauge resistors R1b to R4b for detecting the acceleration acting in the Z-axis direction are arranged at outer portions of the diaphragm 9, while the gauge resistors R1a to R4a for detecting the acceleration in the Y-axis direction are arranged in the central region of the diaphragm 9 adjacent to the pedestal, as shown in FIG. 3A. These gauge resistors are connected to form bridge circuits as shown in FIGS. 3B and 3C.

According to this arrangement, the gauge resistors R1b to R4b, which are arranged on outer portions of the diaphragm 9, receive greater stress than in the first embodiment, thus exhibiting a greater change in the resistance, whereby the acceleration sensor exhibits higher sensitivity to the acceleration acting in the Z-axis direction. The gauge resistors R1a to R4a, which are arranged on the central region of the diaphragm 9, suffers from reduced influence of acceleration acting in Z-axis, thus exhibiting higher accuracy of detection of acceleration acting in the Y-axis direction.

Third Embodiment

In the first and second embodiments, a pair of bridge circuits composed of gauge resistors are arranged on the same diaphragm 9 which is thin-walled in the Y-axis direction and which has a reduced width as measured in the Z-axis direction. In the third embodiment, the bridge circuit for sensing acceleration acting in the Z-axis direction is arranged on a different portion of the acceleration sensor beam from those in the first and second embodiments.

Figure 4A:
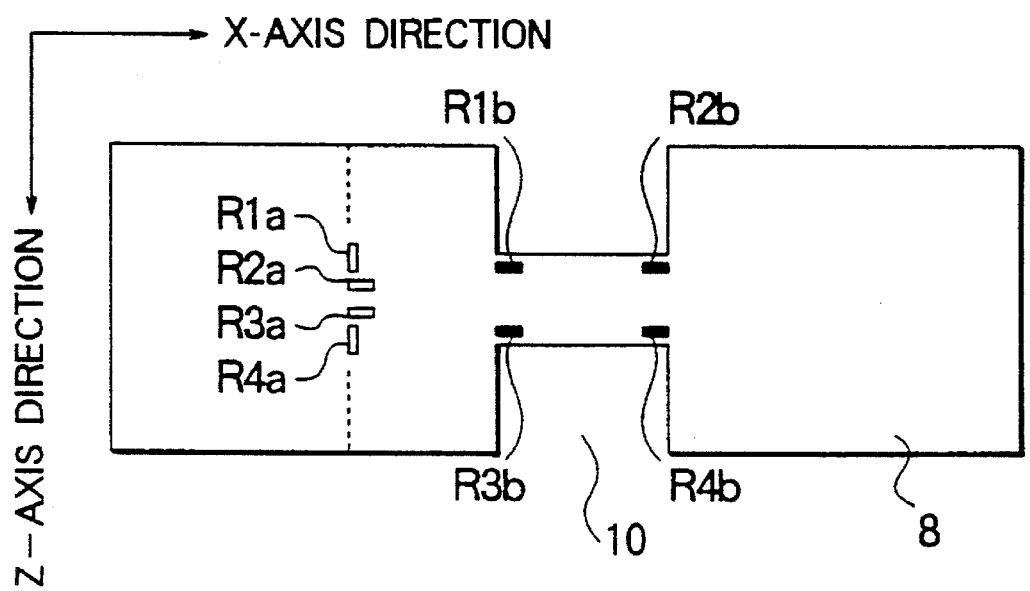
FIGS. 4A and 4B are a plan view and a sectional side elevational view of a critical portion of a third embodiment of the semiconductor acceleration sensor in accordance with the present invention.
Figure 4B:
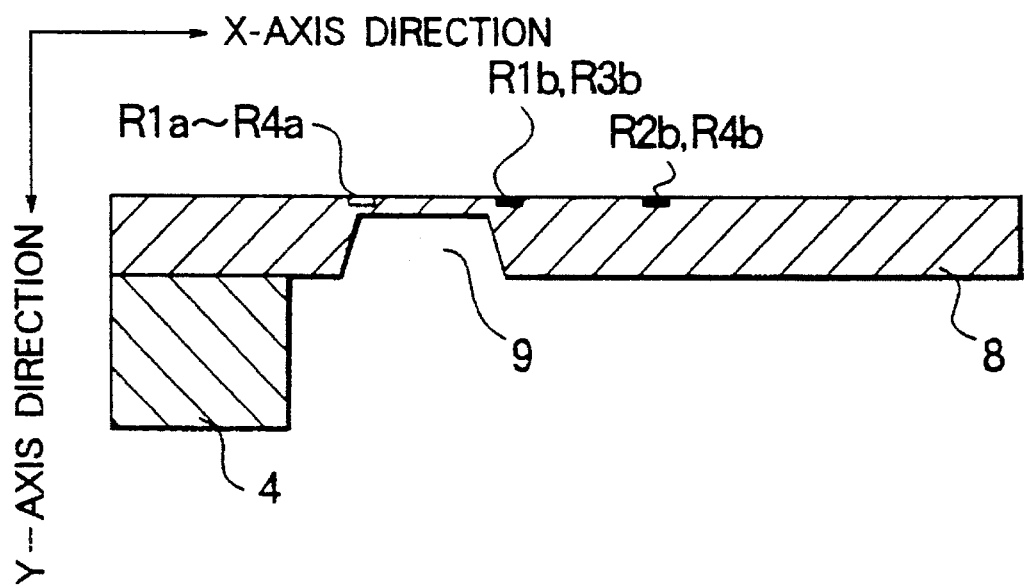
Figure 5:
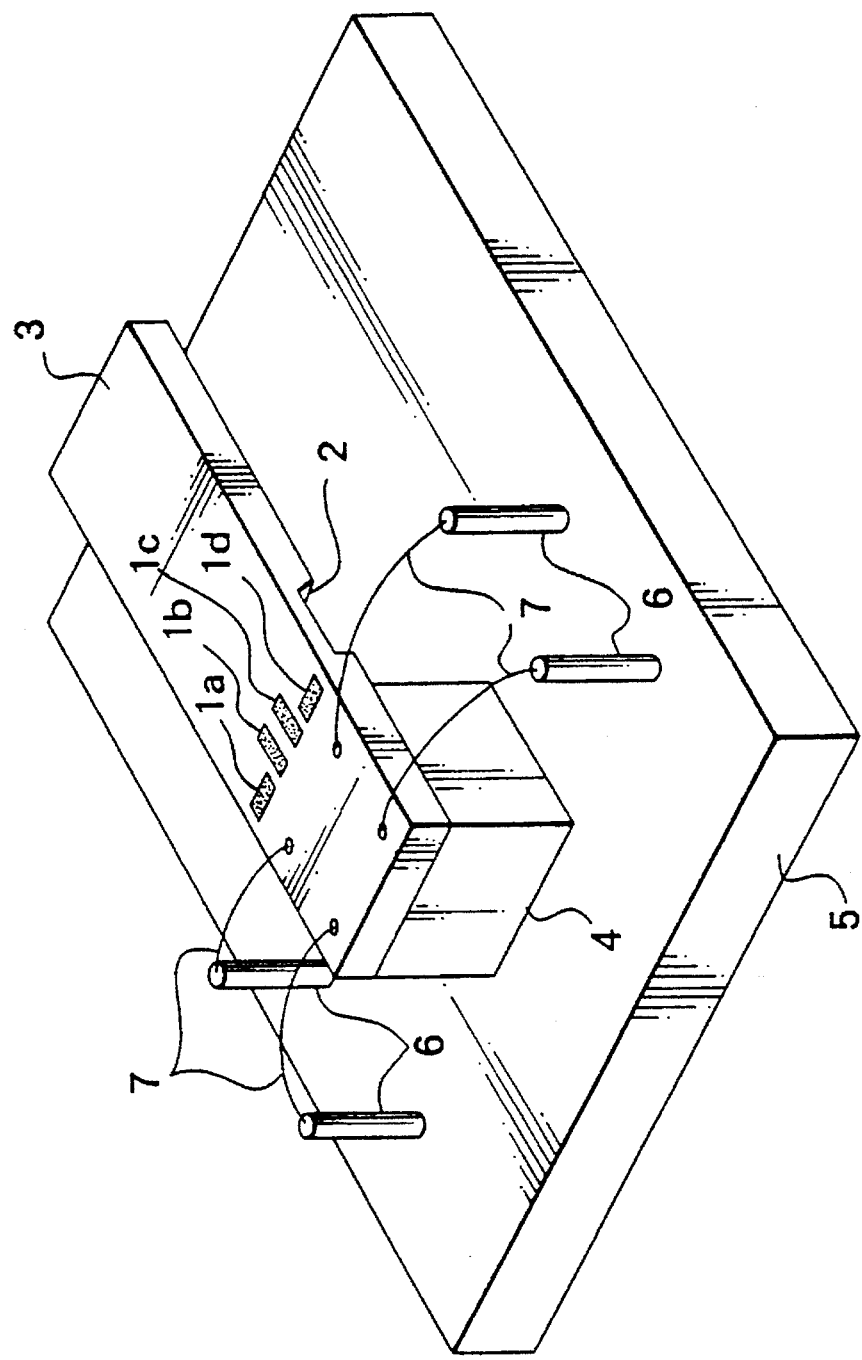
FIG. 5 is a perspective view of a conventional semiconductor acceleration sensor.

More specifically, as shown in FIGS. 4A and 4B, the bridge circuit composed of gauge resistors R1a to R4a for detecting acceleration acting in the Y-axis direction is arranged on the diaphragm 9, whereas the bridge circuit composed of the gauge resistors R1b to R4b for sensing acceleration acting in the Z-axis direction is arranged on the narrowed portion 10 of the acceleration sensor beam 8.

According to this arrangement, the diaphragm 9 carrying the gauge resistors R1a to R4a is more easily deflectable in the Y-axis direction, thus exhibiting enhanced sensitivity to acceleration acting in this direction. However, the diaphragm 9 exhibits a large rigidity to force acting in the Z-axis direction, thus exhibiting smaller sensitivity to acceleration acting in this direction. Conversely, the narrowed portion 10 carrying the gauge resistors R1b to R4b exhibits a large rigidity against force acting in the Y-axis direction, but exhibits enhanced sensitivity to acceleration acting in the Z-axis direction. It is therefore possible to detect acceleration in two orthogonal directions with high degree of accuracy.

Although the invention has been described through its specific forms, it is to be noted that the described embodiments are only illustrative and various changes and modifications may be imparted thereto without departing from the scope of the invention which is limited solely by the appended claims.

What is claimed is:

1. A semiconductor acceleration sensor comprising:
    an acceleration sensor beam having first and second opposing surfaces;
    a diaphragm formed on the first surface of said acceleration sensor beam, said diaphragm having a width less than the width of the acceleration sensor beam as measured in a direction perpendicular to the longitudinal axis of said acceleration sensor beam;
    a pair of groups of gauge resistors arranged on a first side of said diaphragm at end portions of said diaphragm as viewed in the longitudinal direction of said acceleration sensor beam;
    first and second bridge circuits formed by electrically connecting the gauge resistors of the respective groups, said first bridge circuit being formed by connecting the gauge resistors of one of said groups to sense acceleration acting in direction of thickness of said acceleration sensor beam, the second bridge circuit being formed by connecting the gauge resistors of the other of said groups to sense acceleration acting in the direction which is perpendicular both to the longitudinal and thickness directions of said acceleration sensor beam, wherein each gauge resistor of said second bridge circuit is disposed at a respective corner of the first side of said diaphragm.

2. A semiconductor acceleration sensor, comprising:

an acceleration sensor beam;

a diaphragm formed on one of the major opposing surfaces of said acceleration sensor beam;

a first group of gauge resistors arranged on a first side of said diaphragm;

a narrowed portion of said acceleration sensor beam, formed at a location other than the location where said diaphragm is formed;

a second group of gauge resistors arranged on said narrowed portion;

a first bridge circuit formed by connecting said gauge resistors of said first group so as to sense acceleration acting in the thicknesswise direction of said acceleration sensor beam;

a second bridge circuit formed by connecting said gauge resistors of said second group so as to sense acceleration acting in the direction perpendicular both to the longitudinal and thicknesswise directions of said acceleration sensor beam;

a pedestal which cantilevers said acceleration sensor beam;

a base substrate to which said pedestal is fixed; and electrical connecting means for transmitting electrical signals from said acceleration sensor beam to the exterior of said sensor.

* * * * *